United States Patent Office 3,527,834
Patented Sept. 8, 1970

3,527,834
CONVERSION OF BUTENE-2 TO BUTENE-1
William L. Kehl, Indiana Township, Allegheny County,
Raymond J. Rennard, Jr., O'Hara Township Allegheny
County, and Harold E. Swift, Gibsonia, Pa., assignors
to Gulf Research & Development Company, Pittsburgh,
Pa., a corporation of Delaware
No Drawing. Filed May 28, 1969, Ser. No. 828,713
Int. Cl. C07c 5/22
U.S. Cl. 260—683.2
7 Claims

ABSTRACT OF THE DISCLOSURE

Butene-2 is converted to butene-1 at elevated temperatures in the presence of a zinc chromium ferrite catalyst.

---

The present invention relates to a process for the isomerization of butene-2 to butene-1 using a zinc chromium ferrite catalyst.

Butene-2 is obtained as a product of petroleum refining and chemical conversion processes. For example, in the process for the disproportionation of propylene, ethylene and butene-2 are produced. However, butene-1 is generally more desired as a reactant than butene-2 because of the greater reactivity of butene-1 and the greater demand for its reaction products. For example, butene-1 can be epoxidized and then be converted to butanal, butanol-1 or butyric acid. Also, it is much easier to polymerize butene-1 than butene-2 and butene-1 can be dimerized to 2-ethyl-1-hexene which is a desirable plasticizer intermeidate. Therefore, the conversion of butene-2 to butene-1 would represent an upgrading of butene-2 for many applications. Titanium trichloride and an organo-aluminum compound have separately been proposed as catalysts for this reaction.

We have discovered as the basis of our invention a novel and economical process for isomerizing butene-2. In our process the butene-2 is passed through a bed of a zinc chromium ferrite catalyst at an elevated temperature. In the preferred operation steam is present as a significant constituent of the feed stream, since it has been observed that the catalyst life is enhanced when steam is present in the feed stream. The reaction is preferably carried out in an oxygen-free atmosphere although a minor amount of oxygen can be tolerated in the feed stream. Since oxygen effects a significant reduction in the selectivity of the desired reaction, it is important that the amount of oxygen be kept small that is, no greater than about 0.15 mol per mol of butene-2.

We prefer to carry out our isomerization procedure at a temperature from about 400° C. to about 485° C. although the broader range of about 400° C. to about 550° C. will result in significant amounts of the desired butene-1. A lower temperature results in a low conversion and selectivity to butene-1 while higher temperatures result in high conversions with a tendency to produce cracked products. At the optimum temperature we find that equilibrium conversion conditions are superior for the production of butene-1.

As indicated, steam is preferably included in the feed stream to help prevent aging of the catalyst. The amount of steam that is utilized can vary from about five to about 20 mols per mol of butene-2 and preferably from about seven to about 15 mols per mol of butene-2. It is believed that the steam in the feed stream delays catalyst aging by preventing the deposition of coke on the catalyst or by removing coke from the catalyst after it is deposited. Another gas such as nitrogen, helium, argon, methane, ethane, carbon dioxide and the like can be used as an inert diluent for the butene-2. The effect of this diluent is to increase selectivity to butene-1 at the expense of conversions. These gases are less desirable than steam.

Oxygen is preferably totally excluded from the reaction gas stream. However, it may be advantageous in some instances to add minor amounts of oxygen to the feed stream to supply heat for the desired reaction by the partial oxidation of the butene-2, but as indicated, this results in a significant reduction in the selectivity of the reaction to butene-1. The oxygen content can vary from 0 to about 0.15 mol per mol of butene-2 and preferably no greater than about 0.10 mol per mole of butene-2.

The zinc chromium ferrite catalyst is preferably used as a fixed bed catalyst with the reacting gas stream passed through it in either an upflow or downflow operation. This reaction gas stream is flowed through the catalyst bed at a gas hourly space velocity based on butene-2 of about 300 to about 2000 and preferably from about 450 to about 1300 for best overall results. Pressure does not appear to be a significant factor in this reaction. We find that a pressure from about 0.5 to about 50 p.s.i.g. is convenient.

The catalysts useful in the present invention are zinc chromium ferrites containing, as the active components thereof, zinc, chromium and iron cations in a single phase spinel compound. The catalyst can be employed in the form of the homogeneous zinc chromium ferrite, per se, or as a heterogeneous composition containing a mixture of the oxides of said cations and the single phase spinel compound.

The catalyst employed in the present invention can be represented by the empirical formula $Zn_xCr_yFe_zO_4$ wherein $x$ can vary within the range of from about 0.1 to about 3, $y$ can vary from greater than 0 to less than 2 and $z$ can vary from greater than 0 to less than 3. In a preferred form of the catalyst $x$ can vary within the range of about 0.1 to about 2.0, $y$ can vary from about 0.1 to about 1.8 and $z$ can vary from about 0.25 to about 1.9 while in a more preferred form $x$ can vary from about 0.8 to about 1.3, $y$ can vary from about 0.2 to about 1.5 and $z$ can vary from about 0.5 to about 1.8. In the most preferred form of the catalyst $x$ is about 1.0.

In the homogeneous structure, all of the elements are located in a single phase zinc chromium ferrite compound. In the ideal homogeneous structure all of the tetrahedral sites are filled by zinc because of its low octahedral site stabilization energy and all of the octahedral sites are filled with chromium and iron, therefore $x$ is 1.0 and the sum of $x+y+z$ is 3.0 in this ideal structure. However, this ideal structure is unlikely to be encountered since a minor amount of the zinc will likely end up in octahedral sites and a minor amount of the iron will likely end up in tetrahedral sites. In view of this, it can be stated that in the actual homogeneous zinc chromium ferrite $x$ is about 1.0, the sum of $x+z$ is about 2.0, and the sum of $x+y+z$ is about 3.0.

In the heterogeneous composition, also represented by the empirical formula $Zn_xCr_yFe_zO_4$, there will be present the single phase zinc chromium ferrite compound as well as one or more oxides or combined oxides of one or more of the constituent cations. For example, if in the empirical composition $x$ is about 3, the catalyst will contain a major amount of zinc oxide and a minor amount of a zinc chromium ferrite compound. In this instance the composition will possess catalytic activity due to the zinc chromium ferrite compound with zinc oxide serving essentially as an inert diluent. Chromium and iron oxides, if present, may not be inert, i.e., they can have some activity for the desired reactions but with lower selectivity to the desired reaction, however, they will not substantially affect the high conversions and selectivity obtained from the spinel phase.

The zinc chromium ferrites can be conveniently prepared by employing as starting materials salts of zinc, chromium and iron, in which salts the metals are contained as cations. Any such salt of said metals is satisfactory, however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion of the precursor, and thus in the final product, of any contaminant it is essential that either a volatilizable base or a base containing no deleterious contaminants such as, for example, sodium be employed. Any base which can be vaporized readily under the conditions used for drying and calcining can be employed, such as, for example, ammonium carbonate, ammonium bicarbonate and amomnium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about four to about 60 hours while calcining can be effected at temperatures ranging from about 500° C. to about 1000° C. for a period of from about two to 16 hours.

It has been found that iron hydroxide precipitates from an aqueous solution of $Fe(NO_3)_3 \cdot 9H_2O$ in ammonium hydroxide substantially completely at pH 11.0 to 11.5, while chromium and zinc hydroxides precipitate most completely from an aqueous solution of their nitrates in ammonium hydroxide at a pH of about 9.0. Accordingly, a method for the preparation of zinc chromium ferrite comprises co-precipitating the zinc and chromium hydroxide in ammonium hydroxide at a pH of about 8.8 to 9.0 in one container, and precipitating the iron hydroxide separately in ammonium hydroxide at a pH of about 11.3 in a second container. After both precipitates have been washed several times by decantation, they are combined, mixed thoroughly, preferably with heating at about 90° C., for several hours. Thereafter, the resulting mixture of the combined precipitates is recovered by filtration, dried at about 120° C. and calcined for 16 hours at about 650° C. to form the zinc chromium ferrite catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst.

We now describe by way of specific examples the use of our invention, however, these examples are not to be construed in any manner as limiting our invention.

EXAMPLE 1

A mixture of 6.8 grams of 10 to 20 mesh $ZnCrFeO_4$, having a surface area of 14 $M^2/g$. and 10 to 20 mesh silicon carbide was loaded into a ¾ inch stainless steel reactor. The reactor was heated by an electric furnace with internal temperatures measured by means of a concentric thermocouple well running the length of the reactor. A mixture of butene-2 and steam was passed through the reactor at a temperature of 465° C. The molar ratio of steam to butene-2 was 10 to 1 and the gas hourly space velocity was 600 based on the butene-2. The reaction resulted in a total conversion of butene-2 of 31 percent at a selectivity of 89 percent to butene-1. This level of activity was maintained for approximately 15 hours after which the activity started to decline. The catalyst was restored to its original activity by heating in air at the reaction temperature for five minutes. Butadiene was obtained in minor amounts as the main constituent of the remaining product fraction.

EXAMPLE 2

A series of runs was conducted using the same feed gas mixture and the same conditions including temperature as used in Example 1 except that minor amounts of oxygen were added to the feed gas stream. The conversion and selectivity to butene-1 of these runs as well as Example 1 are set forth in Table I.

TABLE I

| $O_2$/butene-2 molar ratio | Butene-2 converted, percent | Selectivity to butene-1, percent |
|---|---|---|
| 0.50 | 53 | 31 |
| 0.33 | 48 | 41 |
| 0.20 | 42 | 58 |
| 0.10 | 37 | 71 |
| 0 | 31 | 89 |

This example demonstrates the significant detrimental effect of oxygen in the feed gas stream on the selectivity of the reaction to butene-1. Carbon dioxide and butadiene are the primary products other than butene-1 when oxygen is present.

Other experiments demonstrated that zinc chromium ferrite catalysts having high surface areas are superior to otherwise equivalent catalysts having lower surface areas because the higher surface area catalysts are substantially more resistant to aging. For example, a catalyst having a surface area of 7 $M^2/g$. was better in terms of lower aging than one having a surafce area of 1.8 $M^2/g$. while a catalyst having a surface area of 14 $M^2/g$. was significantly superior than the other two. Results equivalent to those specifically set forth herein are also obtained when other catalysts described by the above empirical formula are used for the isomerization of butene-2 to butene-1.

It is to be understood that the above disclosure is by way of specific example and that numerous modifications and variations are available to those of ordinary skill in the art without departing from the true spirit and scope of the invention.

We claim:

1. A process for the conversion of butene-2 to butene-1 comprising contacting butene-2 with a zinc chromium ferrite catalyst having the empirical formula $Zn_xCr_yFe_zO_4$ where $x$ ranges from about 0.1 to about 3, $y$ ranges from greater than 0 to less than 2 and $z$ ranges from greater than 0 to less than 3, at a temperature of about 400° C. to about 550° C. wherein the butene-2 feed contains no more than about 0.15 mole of oxygen per mole of butene-2.

2. A process in accordance with claim 1 in which the zinc chromium ferrite catalyst has the formula
$$Zn_xCr_yFe_zO_4$$
wherein $x$ ranges from about 0.1 to about 2.0, $y$ ranges from about 0.1 to about 1.8 and $z$ ranges from about 0.25 to about 1.9.

3. A process in accordance with claim 2 in which the zinc chromium ferrite catalyst has the formula
$$Zn_xCr_yFe_zO_4$$
wherein $x$ ranges from about 0.8 to about 1.3, $y$ ranges from about 0.2 to about 1.5 and $z$ ranges from about 0.5 to about 1.8.

4. A process in accordance with claim 3 comprising a mixture of said butene-2 and a gaseous inert diluent.

5. A process in accordance with claim 4 in which the inert diluent is steam in a molar ratio of steam to butene-2 of about 5 to 1 to about 20 to 1.

6. The process in accordance with claim 5 in which $x$ of the formula $Zn_xCr_yFe_zO_4$ is about 1.0.

7. A process in accordance with claim 6 in which the zinc chromium ferrite has the empirical formula of substantially about $ZnCrFeO_4$.

References Cited

UNITED STATES PATENTS

| | | |
|---|---|---|
| 3,450,788 | 6/1969 | Kehl et al. |
| 3,453,344 | 7/1969 | Safarovich et al. |
| 3,420,911 | 1/1969 | Woskow. |

DELBERT E. GANTZ, Primary Examiner

V. O'KEEFE, Assistant Examiner